Oct. 25, 1932.  W. H. RANDALL  1,884,857
STEAM TRAP
Filed Sept. 18, 1930   2 Sheets-Sheet 1

Inventor:
William H. Randall

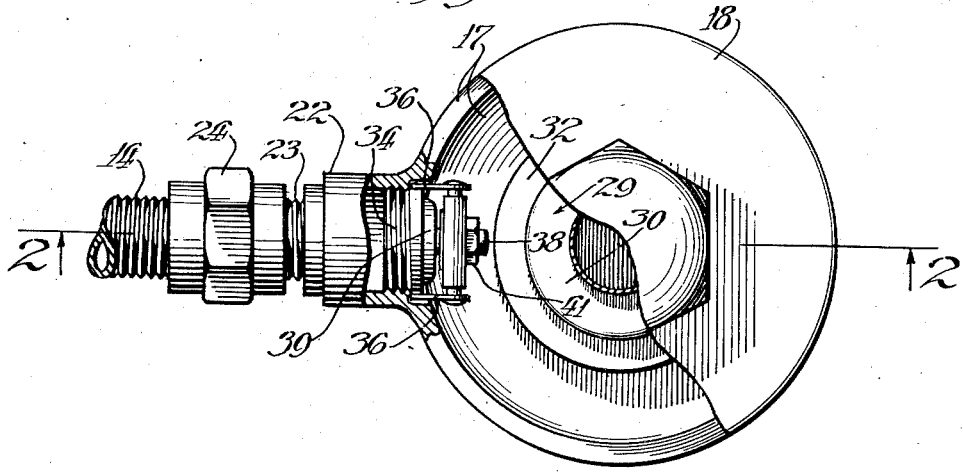
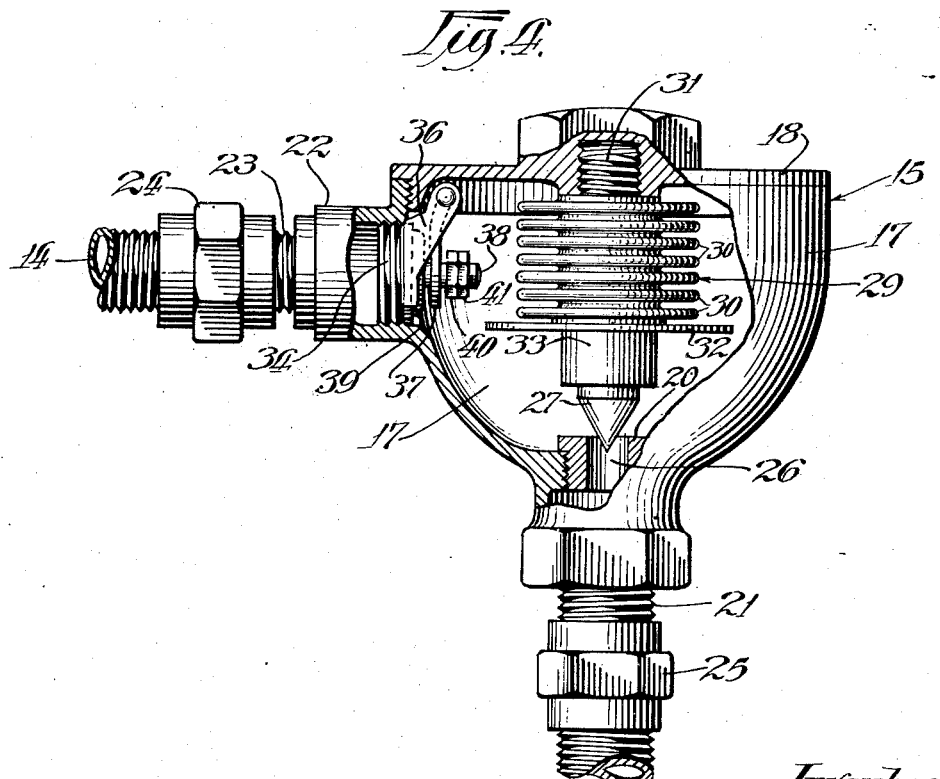

Patented Oct. 25, 1932

1,884,857

UNITED STATES PATENT OFFICE

WILLIAM H. RANDALL, OF CHICAGO, ILLINOIS

STEAM TRAP

Application filed September 18, 1930. Serial No. 482,663.

This invention relates to steam traps, and an object of the invention is the provision of an improved device of this character which is simple and durable in construction and operation, economical to manufacture, and highly efficient for the purpose. A more particular object is the provision of a steam trap for the control and regulation of the outlet flow of water of condensation from a container to which steam is supplied such as a radiator for heating purposes. A further object is the provision of an improved steam trap adapted to automatically control and release condensed liquid in a steam radiator connected to a heating plant embodying a single pipe system of supply and return. An additional object is the provision of an improved trap adapted to cooperate with the modulating or steam supply control valve of a steam radiator in such manner as to automatically release water of condensation and normally maintain the radiator in a dry condition, allowing the radiator to be heated in accordance with the regulation of the supply valve.

Other objects will appear hereinafter.

The invention consists in the combinations and arrangements of parts hereinafter described and claimed.

The invention will be best understood by reference to the accompanying drawings forming a part of this specification, in which:

Fig. 3 is a plan view of the device, partly in section;

Fig. 4 is a view similar to Fig. 2, showing certain parts in elevation, and also showing the main trap valve in open position and the auxiliary radiator outlet valve in closed position.

Figure 1:
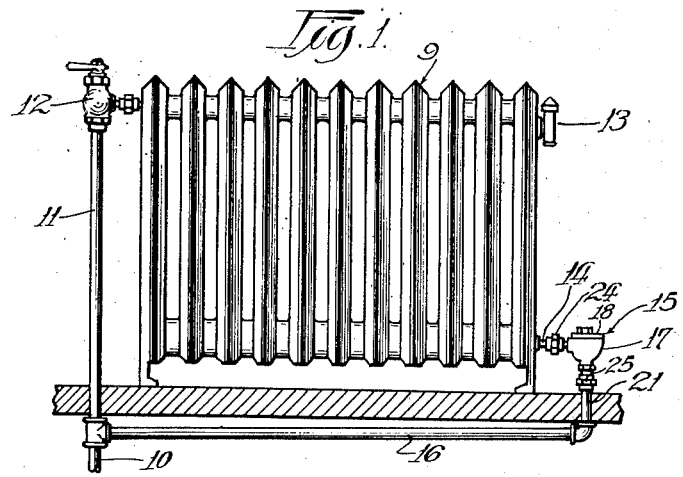
Fig. 1 is an elevational view of the device of the present invention operatively connected to a steam radiator of a single pipe steam heating plant.
Figure 2:
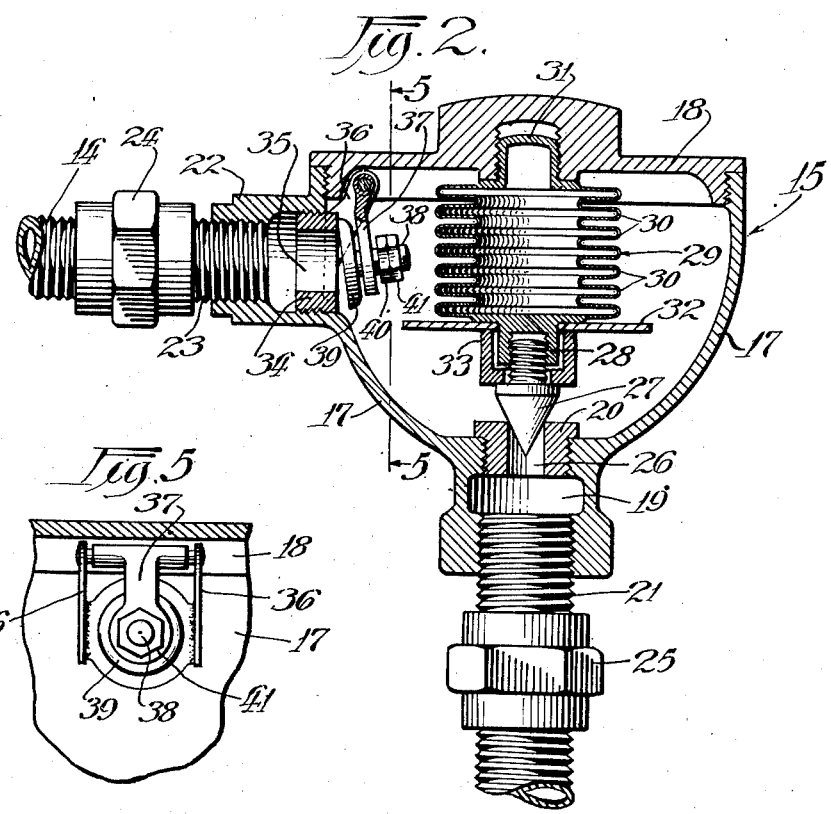
Fig. 2 is an enlarged vertical sectional view of the device of the invention showing the main trap valve in closed position, and the auxiliary valve connected to the radiator outlet in open position.
Figure 5:
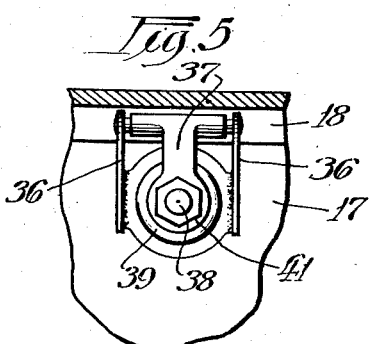
Fig. 5 is a detail view of the auxiliary valve taken substantially on the line 5—5 of Fig. 2.

As illustrated in the drawings, the preferred embodiment of the invention is shown operatively connected to a steam radiator 9 which receives a steam supply from steam riser 10 connected to steam supply pipe 11, which in turn is connected to a modulating or supply regulating valve 12 connected to radiator 9 adjacent the upper portion thereof, as shown in Fig. 1. Radiator 9 is provided with the usual air vent 13 and is also provided with an outlet pipe 14 adjacent the lower portion of the radiator for the discharge and release of water resulting from condensation of steam within the radiator. Outlet pipe 14 is connected to the upper portion of steam trap 15 and the lower portion of trap 15 is connected to branch pipe 16 which is connected to steam riser 10.

The trap proper comprises a casing 17 which, in the embodiment shown, is semi-spherical in general outline for facility in construction and use. Casing 17 is internally threaded to receive cover 18 and is also provided with a central lower opening 19 into which is threaded upper valve seat plug 20 and lower connecting pipe 21 which is connected to branch pipe 16. The upper portion of the casing 17 has a laterally offset extension 22 which is threaded to receive short pipe 23 connected by union 24 to the radiator outlet pipe 14, and a similar union 25 may be disposed in pipe 21. The valve seat 20 is provided with a central cylindrical orifice 26 which serves as a seat for conical valve head or member 27 of the main trap valve which is connected to stem 28 of thermostat element 29. Element 29 is composed of a plurality of accordion fins 30 and is filled with a heat responsive medium such as a mixture of ether and alcohol, whereby the valve is sensitive to heat and subject to expansion upon contact with steam and contraction when cooled.

As shown, valve 29 is hermetically sealed and provided with an upper projection 31 which is threaded centrally in the cover 18, whereby the valve is of the self-centering type, and the upper portion of the seating orifice 26 is preferably not tapered, but presents an abrupt edge so as to prevent binding effect against the valve 27. A circular baffle disk 32 is placed upon stem 28 and is held in place by thimble 33 engaged by valve head 27. This plate serves the function of preventing too sudden contact of steam entering through opening 26 with the thermostat portion of the valve, so that the intermittent action will be more gradual as hereinafter explained.

An auxiliary valve is mounted within the extension 22 of the upper portion of the trap which connects with the radiator outlet pipe 14, and comprises a base or seat member 34 threaded within extension 22 and provided with a central port or orifice 35. Member 34 is provided with two inwardly extending arms 36 upon which is pivotally mounted swinging plate 37 which has an opening to receive stem 38 mounted on valve 39. The valve 39 is preferably loosely mounted relative to the supporting plate 37 and for this purpose a spaced retaining nut 40 is engaged by lock nut 41. Thus, valve 39 acts as a check valve between the interior of the trap and the radiator, so as to close when pressure within the trap exceeds that in the radiator, and to open when pressure from the radiator side is greater than that within the trap.

In operation, the modulating valve 12 is manually adjusted to regulate the flow of steam to the radiator 9 from the riser 10 and connecting pipe 11. The present invention permits of any desired portion of the radiator becoming heated depending upon the adjustment of the valve 12 and the pressure of steam. At the same time steam passing through pipe 16 enters the chamber or interior of the trap maintaining the check valve 39 in closed position because of the greater pressure in the interior of the trap as compared with the opposite side communicating with the interior of the radiator. Contact of steam entering through pipe 16 and the connected pipes, with the thermostat member 29, causes expansion and consequent seating of valve member 27 in the seat plug 20. Valve 27 remains closed until the temperature of the thermostat element is lowered to a point less than normal steam temperature. This may be any desired temperature depending upon the particular installation, but in ordinary steam heating systems a temperature of approximately 180 degrees for contraction of the thermostat element has been found satisfactory. Simultaneously, with the closing of valve 27 steam flowing within the radiator 9 is subject to condensation and the water of condensation flows through the outlet pipe 14, where it is confined by valve 39 until the pressure from within the pipe connection 14 is greater than within the trap. This takes place when steam which has entered the trap and caused expansion of the thermostatically controlled valve is cooled and condensed, which causes a partial vacuum or suction effect within the trap, and a consequent reduction of pressure on the trap side of valve 39. Thereupon valve 39 will automatically open allowing the water to flow to the trap. This flow continues for a short period of time until the thermostat element 29 is cooled sufficiently to contract and unseat the valve head 27. As soon as this occurs, steam enters through orifice 26 of plug 20 from pipe 21 to the interior of the trap, causing the thermostat element to expand and close valve 27, and these operations are automatically continued.

The baffle disk 32 serves to spread the inflowing steam and prevent too sudden contact with the thermostat element 29, which produces smoother operation by reason of the gradual expansion of element 29. It will be noted that when valve 39 is closed, valve 27 is open, and conversely, when valve 27 is closed, valve 39 is open, whereby the device continues to operate when steam is admitted to the radiator in the nature of a cooperating breather valve to gradually allow the passage of water of condensation from within the radiator through the branch pipe 16, and it is further to be noted that the vacuum action described contributes to maintain the radiator in a dry condition at all times. The device of the invention also enables any portion of a radiator to be heated by the adjustment of valve 12, and not only is the hammering present in an ordinary one pipe system entirely eliminated, but much greater efficiency is attained in the operation of the radiator.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to secure by Letters Patent is:

1. In a single pipe steam heating system, the combination of a steam supply pipe, a branch pipe connected to said steam supply pipe, a radiator connected to said steam supply pipe, a trap connected between said radiator and said branch pipe, a connection between said trap and said radiator, a thermostat element mounted within said trap and expansible upon contact with steam, a main closure valve mounted upon said thermostat element and arranged to close communication between said trap and said branch pipe when steam is admitted to the trap, and a check valve mounted adjacent the connection between said trap and said radiator and arranged to close communication between said trap and said radiator when pressure within said trap exceeds that from within said radiator.

2. In a single pipe steam heating system, the combination of a steam supply pipe, a branch pipe connected to said steam supply pipe, a radiator connected to said steam supply pipe, a trap connected between said radiator and said branch pipe, a connection between said trap and said radiator, a thermostat element mounted within said trap and expansible upon contact with steam, a main closure valve mounted upon said thermostat element and arranged to close communication between said trap and said branch pipe when steam is admitted to the trap, a check valve mounted adjacent the connection between said trap and said radiator and arranged to close communication between said trap and said radiator when pressure within said trap exceeds that from within said radiator, and a baffle member mounted between said main valve and said thermostat element.

3. In a single pipe steam heating system, the combination of a steam supply pipe, a branch pipe connected to said steam supply pipe, a radiator connected to said steam supply pipe, a trap connected between said radiator and said branch pipe, a connection between said trap and said radiator, a thermostat element mounted within said trap and expansible upon contact with steam, a main closure valve mounted upon said thermostat element and arranged to close communication between said trap and said branch pipe when steam is admitted to the trap, and a valve member mounted adjacent the connection between said trap and said radiator, and arranged to open for passage of water from said radiator to the interior of said trap when said main closure valve is closed.

4. In a single pipe steam heating system, the combination of a steam supply pipe, a branch pipe connected to said steam supply pipe, a radiator connected to said steam supply pipe, a trap connected between said radiator and said branch pipe, a connection between said trap and said radiator, a thermostat element mounted within said trap and expansible upon contact with steam, a main closure valve mounted upon said thermostat element and arranged to close communication between said trap and said branch pipe when steam is admitted to the trap, a valve member mounted adjacent the connection between said trap and said radiator, and arranged to open for passage of water from said radiator to the interior of said trap when said main closure valve is closed, and a baffle member mounted adjacent said thermostat element for distributing steam entering from said branch pipe.

In testimony whereof I have signed my name to this specification.

WILLIAM H. RANDALL.